No. 621,396. Patented Mar. 21, 1899.
C. M. WILLIAMS.
TRAP.
(Application filed Oct. 17, 1898.)
(No Model.)
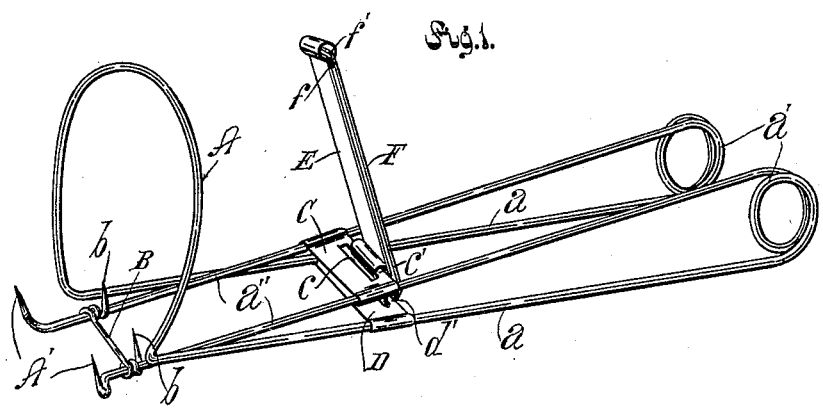
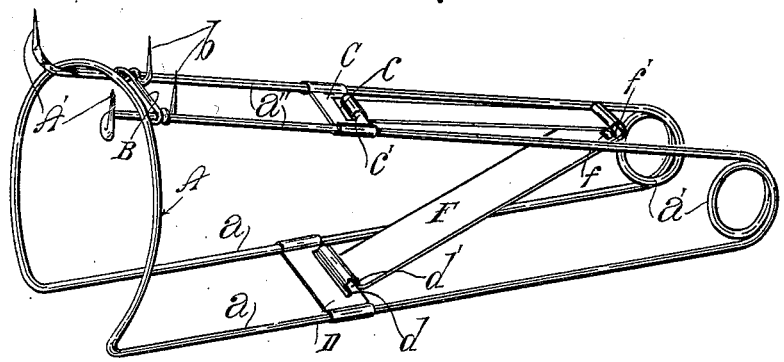
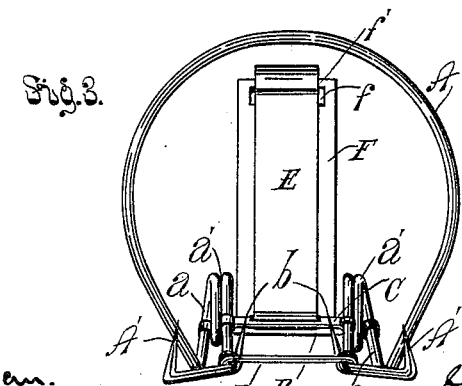
Witnesses
Percy Kingman.
E. A. Waterman.
Inventor
Charles M. Williams
by Townsend Bros.
his attys.

UNITED STATES PATENT OFFICE.

CHARLES M. WILLIAMS, OF LOS ANGELES, CALIFORNIA, ASSIGNOR TO THE STAR NOVELTY COMPANY, OF SAME PLACE AND PHŒNIX, ARIZONA.

TRAP.

SPECIFICATION forming part of Letters Patent No. 621,396, dated March 21, 1899.

Application filed October 17, 1898. Serial No. 693,808. (No model.)

*To all whom it may concern:*

Be it known that I, CHARLES M. WILLIAMS, a citizen of the United States, residing at Los Angeles, in the county of Los Angeles and State of California, have invented new and useful Improvements in Traps, of which the following is a specification.

My invention relates particularly to that class of traps used for catching gophers, which are very destructive to fruit-trees and other vegetable life. These animals often do great damage to irrigating-ditches by burrowing through the banks thereof and causing the water to break forth.

The gopher is an animal which is very difficult to trap, and if it gains a suspicion that anything is wrong it will either fill the trap with dirt and push it out of the whole or leave it unmolested. Their holes are oftentimes made in hard ground, and in such cases it is very difficult to dig the holes larger in order to properly insert into their burrows the traps heretofore in ordinary use, since it is necessary that the opening through which the gopher must pass in reaching the trigger-plate of the trap be sufficiently unobstructed to allow him to pass therethrough before discovering that he is encircled by the loop, and the construction of the trap heretofore has required that the noose or loop be much larger than the hole, since the barbs project into the noose and partially close it.

The object of my invention is to provide a trap which will be so adapted and arranged that the loop through which the gopher must pass to spring the trap need be made but very little larger than the gopher's body and to so arrange the spring members of the trap that the trap can be inserted into any ordinary-sized gopher-hole without necessity of enlarging it and yet avoid any obstruction which will alarm the animal entering the trap.

A further object of my invention is to provide a trap which will have an extremely sensitive trigger and which may be set with the greatest facility and without any liability whatever of having the fingers or hands of the operator caught and torn by the spear-points of the trap.

My invention also comprises means whereby the body of the gopher is engaged both in front and at the rear of the loop, against which the spring-arms force it, so that thereby the back of the gopher will be broken and its sufferings speedily ended.

My invention comprises the various features of construction and combinations of parts, whereby I produce a gopher-trap of the utmost simplicity, cheapness of construction, and convenience of operation.

In the accompanying drawings, illustrating my invention, Figure 1 is a perspective side elevation showing my improved trap in its set position. Fig. 2 is a side elevation of the same, showing the trap sprung. Fig. 3 is a front elevation showing my improved trap in its set position.

In the drawings, A represents a U-shaped loop having its parallel side members $a$ (which are at the bottom) carried toward the rear, formed into coils $a'$, then carried toward the front, forming parallel spring members or arms $a''$, passed through the loop, bent outwardly and upwardly, and formed into spear-points A', which when the trap is set stand in line with the sides of the loop in order to avoid obstructing the opening through the loop which fits into the gopher-hole.

B is a wire cross-arm, which is twisted around the parallel upper spring members of the trap, bent upward, and formed into points $b$, which are arranged upon the rear side of the U-shaped loop when the trap is sprung, as shown in Fig. 2. Thus the points A' upon the ends of the side members engage with the body of the gopher in front of the loop and the points $b$ of the cross-bar engage with the body of the gopher at the rear of the loop, so that thereby when the trap is sprung the gopher's back is broken by its engagement with the loop.

I will now describe one important feature of my invention whereby by means of two cross-bars C and D, I hold the members of the trap rigid with relation to each other. The cross-bars are each formed of sheet metal and each has its ends bent around its respective side members of the trap and rigidly secured thereto by solder or brazing. The cross-bars are approximately from one-half to three-quarters of an inch in width, and thus they have sufficient bearing to prevent the side members from racking axially with relation to each other and to hold them rigidly in position. In the cross-bar C, I form a slot $c$, which is sufficiently near to one edge to form a pintle or pivot member $c'$, around which is bent the lower end of the trip-plate E.

In the lower cross-bar D, I form a slot $d$, which is near the rear edge of the bar and forms a pintle or pivot member $d'$, around which is bent the lower end of the trigger-arm F, the upper end of which is provided with a slot $f$, forming a pintle or pivot member $f'$, around which is bent the upper end of the trip-plate E. The trip-plate member is shorter than the trigger-arm member, and when the spring-pressed members of the trap (the spring-arms $a'$) are pressed down into their set position, as shown in Fig. 1, the middle or intermediate pivotal point, that at which the trip-plate is pivoted to the upper cross-bar, is arranged slightly at the rear of a line passing through the two other pivotal points—that is, the point at which the trigger-arm and trip-plate are pivoted together and the point at which the trigger-arm is pivoted to the lower cross-arm—and when the trap is sprung, as shown in Fig. 2, such pivotal point is on the opposite side of such line.

In setting the trap the spring members are forced downward toward the base, thus bringing the lower ends of the trip-plate and trigger-arms nearer together and throwing the tops thereof forward and up. The operator then pushes the top of the trigger-arm and trip-plate forward until they are thrown into the position shown in Fig. 1, and the trap is set. This feature, whereby I facilitate the setting of the trap, is one of great importance, since thereby I avoid all danger of injury to the hand, which danger has heretofore been present in traps of this class, in which a complicated arrangement of cross-bars, trip-plates, and locking-levers is provided for the purpose of setting the trap. Also by my arrangement I am enabled to entirely dispense with the need of any front cross-bars connecting the lower or base members of the trap, thus allowing the upper spring members to pass between and occupy a position at the open mouth of the U-shaped loop, leaving the passage through the loop practically free for the gopher.

By bending the ends of the side or the spring members outward and upward to form the points A' they are brought practically parallel with the members of the U-shaped loop when the trap is set and are thus entirely out of the way of the gopher, so that it enters the loop without suspicion.

Now, having described my invention, what I claim as new, and desire to secure by Letters Patent, is—

1. In a trap, the combination of the base provided with the loop; the spring-arm secured to the base and adapted to spring against the loop; a trigger-arm hinged to the base; and a trip-plate, hinged at one end to the spring-arm, and hinged at the other end to the trigger-arm.

2. In a trap, the combination of the base provided with the loop; the spring-arms secured to the base and adapted to spring outward against the loop; the cross-bar secured to the base; the trigger-arm pivoted to such cross-bar; the cross-bar secured to the spring-arms; the trip-plate pivoted or hinged to such cross-bar, and pivoted or hinged to the trigger-arm.

3. A trap comprising a base; a spring-pressed member secured to the base; a trigger comprising two members of unequal length, hinged together at one end, the other end of one member being hinged to the base and the other end of the other member being hinged to the spring-pressed member of the trap, the parts being so arranged relative to each other that when the trap is set, the intermediate hinged point will be arranged on the opposite side of a line passing through the two other hinged points from that which it occupies when the trap is sprung.

4. In a trap, the combination of the U-shaped loop having its side members extending toward the rear, thence returned toward the front to form spring members, passed through the loop, bent outwardly and upwardly and provided with spear-points; a cross-arm connecting the spring members and arranged, when the trap is sprung, at the rear of the loop, having its ends bent upwardly and provided with points; the cross-bar connecting the two lower side members at the rear of the U; the cross-bar connecting the two spring members; and a trip-plate secured to one cross-bar and pivotally secured, by intermediate means, to the other cross-bar and adapted to hold the trap in its set position.

5. In a trap, the combination of the U-shaped loop having its side members extending toward the rear, thence returned toward the front, passed through the loop and provided with spear-points; a lower cross-bar connecting the lower side members, formed of sheet metal and provided with a slot; an upper cross-bar formed of sheet metal, provided with a slot and connecting the spring members; a trip-plate formed of sheet metal having its lower end formed about one of the side members of the slotted upper cross-bar; a trigger-arm having its lower end formed about one of the side members of the slotted lower cross-bar, and having its upper end pivotally secured to the trip-plate, and adapted to hold the trap in its set position.

6. A trap provided with a U-shaped loop having its side members extended to the rear, formed into coils and thence extended to the front to form spring-arms, passed through the loop and bent upward to form spear-points; a sheet-metal cross-bar connecting the rearwardly-extended side members of the U, and arranged substantially midway between the U and the coils; a cross-bar connecting the spring-arms; a trigger secured to one crossbar and arranged to engage the other bar to hold the trap in its set position, the lower side members between the loop and the cross-bar being devoid of connections, to thereby allow the spring-arms to pass down between them, whereby the spear-points are practically withdrawn from the loop when the trap is set.

7. A trap provided with a U-shaped loop and spring members adapted to spring against the loop, and spear-points arranged upon the spring members and to occupy positions both in front and at the rear of the loop when the trap is sprung.

8. A trap provided with a loop and spring-arms to spring against the loop, the ends of the spring-arms being bent outward and upward to form spear-points arranged to stand practically in line with the side members of the loop when the trap is set.

CHAS. M. WILLIAMS.

Witnesses:
ALFRED I. TOWNSEND,
JAMES R. TOWNSEND.